United States Patent [19]

Yamamoto et al.

[11] Patent Number: 5,248,249
[45] Date of Patent: Sep. 28, 1993

[54] THREE-DIMENSIONAL STRUCTURE FORMING APPARATUS PROVIDED WITH A LIQUID-LEVEL CONTROL SYSTEM FOR A MAIN RESIN TANK

[75] Inventors: Masanobu Yamamoto, Kanagawa; Kazumine Itoh, Tokyo, both of Japan

[73] Assignee: Sony Corporation, Tokyo, Japan

[21] Appl. No.: 998,766

[22] Filed: Dec. 29, 1992

Related U.S. Application Data

[63] Continuation of Ser. No. 735,840, Jul. 25, 1991, abandoned.

[30] Foreign Application Priority Data

Jul. 27, 1990 [JP] Japan .................................. 2-200092

[51] Int. Cl.$^5$ ............................................ B29C 35/08
[52] U.S. Cl. .................................. 425/174.4; 118/620; 118/641; 264/22
[58] Field of Search ............... 425/174.4, 174; 264/22, 264/308; 118/620, 641; 427/496, 508, 498, 512, 521, 551–555; 156/58, 272.8

[56] References Cited

U.S. PATENT DOCUMENTS

| | | | |
|---|---|---|---|
| 4,229,417 | 10/1980 | Kanai et al. | 261/36.1 X |
| 5,011,635 | 4/1991 | Murphy et al. | 425/174.4 X |
| 5,058,988 | 10/1991 | Spence | 425/174.4 X |
| 5,059,266 | 10/1991 | Yamane et al. | 425/174.4 X |
| 5,071,337 | 12/1991 | Heller et al. | 425/174.4 |
| 5,106,288 | 4/1992 | Hughes | 425/174.4 |

Primary Examiner—Richard L. Chiesa
Attorney, Agent, or Firm—Hill, Steadman & Simpson

[57] ABSTRACT

A three-dimensional structure forming apparatus for forming an optical three-dimensional structure by sequentially laminating hard resin layers by repeating a hard resin layer forming cycle by irradiating the surface of a liquid photosetting resin with a light beam including a main resin tank which contains liquid photosetting resin and has a liquid level control so as to maintain the liquid level of the photosetting resin constant. A replenishing tank and a resin supply, supply resin to the main resin tank at a predetermined rate so that the resin continuously overflows the main resin tank.

3 Claims, 5 Drawing Sheets

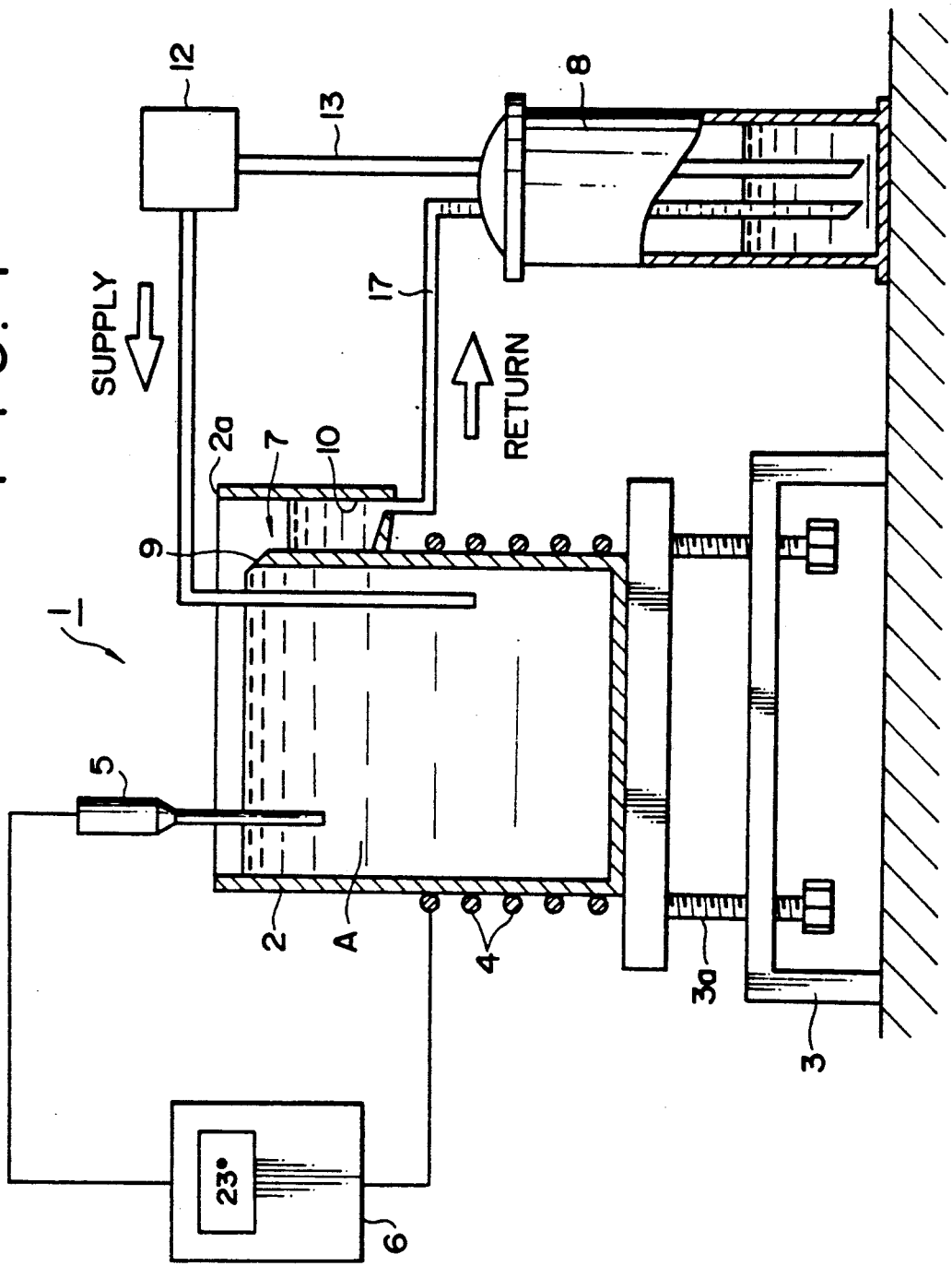

THREE-DIMENSIONAL STRUCTURE FORMING APPARATUS PROVIDED WITH A LIQUID-LEVEL CONTROL SYSTEM FOR A MAIN RESIN TANK

This is a continuation of application Ser. No. 07/735,840 filed Jul. 25, 1991 now abandoned.

BACKGROUND OF THE INVENTION

1. Field of the Invention

The present invention relates to a three-dimensional structure forming apparatus for forming a three-dimensional structure on the basis of an optional stereographic image by irradiating a liquid photosetting resin with a light beam and, more particularly, to a liquid level controller for controlling the liquid level of the liquid photosetting resin contained in a main resin tank.

2. Description of the Prior Art

A method of forming a structure having a desired morphology by irradiating a liquid photosetting resin with a light beam is proposed, for example, in Japanese Patent Application No. Sho 63-267945. FIG. 5 shows an essential portion of a three-dimensional structure forming apparatus 51 for carrying out the method.

The three-dimensional structure forming apparatus 51 has a main resin tank 52 for containing a liquid photosetting resin A which sets when exposed to ultraviolet rays, a horizontal stage 53 having the shape of a plate and placed in the main resin tank 52, an elevating mechanism 54 for vertically moving the stage 53, a scanning unit 55 for irradiating the surface of the liquid photosetting resin A with a light beam, and a molding controller 56 for controlling the exposure and scanning operation of the scanning unit 55 and the operation of the elevating mechanism 54 for moving the stage 53.

In forming a three-dimensional structure of a desired morphology by the three-dimensional structure forming apparatus 51, the elevating mechanism 54 locates the stage 53 an initial position indicated by continuous lines where the liquid photosetting resin A spreads in a predetermined thickness over the stage 53, and then the surface of the liquid photosetting resin A is scanned with a light beam B for raster scanning in a pattern corresponding to the pattern of one of a plurality of parallel planes obtained by slicing an optical stereographic image, which will be referred to as "parallel decomposed planes".

Portions of the liquid photosetting resin A irradiated with the light beam B set in a hard resin layer of a shape corresponding to the pattern of the decomposed plane. Every time one hard resin layer is formed, the elevating mechanism 54 lowers the stage 53 by a predetermined distance corresponding to the pitch of the decomposed planes of the stereographic image to spread the liquid photosetting resin A over the hard resin layer in a thickness corresponding to the pitch of the decomposed planes. Then, the liquid photosetting resin A spreading over the hard resin layer is scanned with the light beam B in a pattern corresponding to the pattern of the next decomposed plane to form a hard resin layer of a shape corresponding to the pattern of the corresponding decomposed plane on the previously formed hard resin layer. These successive hard resin layers join together.

Thus, hard resin layers of shapes respectively corresponding to the patterns of the decomposed planes are formed successively in adjoining layers to form a desired three-dimensional structure.

Thus, a three-dimensional structure can be formed on the basis of an optical image by this method of forming a three-dimensional structure.

In irradiating the surface of the liquid photosetting resin A contained in the main resin tank 52 with the light beam B by the three-dimensional structure forming apparatus to harden portions of the liquid photosetting resin A in a pattern, the diameter of the spot of the light beam B is dependent on the distance between the objective lens of the three-dimensional structure forming apparatus and the surface of the liquid photosetting resin A. Accordingly, if the liquid level of the liquid photosetting resin A contained in the main resin tank 52 is variable, the diameter of the spot of the light beam B is variable and hence it is impossible to form a three-dimensional structure in accurate dimensions.

The liquid level of the liquid photosetting resin A in the main resin tank 52 is liable to vary with the variation of the temperature of the liquid photosetting resin A or with the reduction of the amount of the liquid photosetting resin A contained in the main resin tank 52.

When a very large main resin tank is used or when the light beam is focused in a very small spot to reduce the terminal depth, in particular, the liquid level of the liquid photosetting resin must precisely be controlled. However, no effective liquid level control system for such a purpose has been developed so far.

SUMMARY OF THE INVENTION

Accordingly, it is an object of the present invention to provide a three-dimensional structure forming apparatus provided with a liquid level control system capable of precisely controlling the liquid level of a resin contained in a main resin tank by a simple control method so that a three-dimensional structure can be formed in accurate dimensions.

In one aspect of the present invention, a three-dimensional structure forming apparatus, which laminates hard resin layers sequentially to form an optional three-dimensional structure by repeating a hard resin layer forming cycle comprising irradiating the surface of a liquid photosetting resin with a light beam in a pattern corresponding to the pattern of one of a plurality of parallel decomposed planes obtained by slicing an optical stereographic image to form a hard resin layer of the pattern of the corresponding decomposed plane and spreading the liquid photosetting resin over the hard resin layer, comprises: a main resin tank, a replenishing tank installed near the main tank; and a resin supply means for supplying the liquid photosetting resin from the replenishing tank to the main resin tank. The three-dimensional structure forming apparatus is characterized in that the main resin tank is provided with a liquid level control system for returning the liquid photosetting resin that overflows the main resin tank through a suction opening or an overflow weir formed in one side surface of the main resin tank.

According to the present invention, the liquid photosetting resin contained in the replenishing tank is supplied continuously to the main resin tank, and the liquid photosetting resin that overflows the main resin tank is returned through the suction opening or the overflow weir to the replenishing tank. Consequently, the quantity of the liquid photosetting resin contained in the main resin tank is maintained constant so that the liquid level of the liquid photosetting resin contained in the main resin tank can be maintained constant. Accordingly, a light beam can precisely be focused in a spot of a constant diameter to form a three-dimensional structure in accurate dimensions.

BRIEF DESCRIPTION OF THE DRAWINGS

The above and other objects, features and advantages of the present invention will become more apparent from the following description taken in connection with the accompanying drawings, in which:

FIG. 1 is a schematic sectional view of a three-dimensional structure forming apparatus provided with a liquid level control system, in a first embodiment according to the present invention;

DETAILED DESCRIPTION OF THE PREFERRED EMBODIMENTS

Figure 2A:
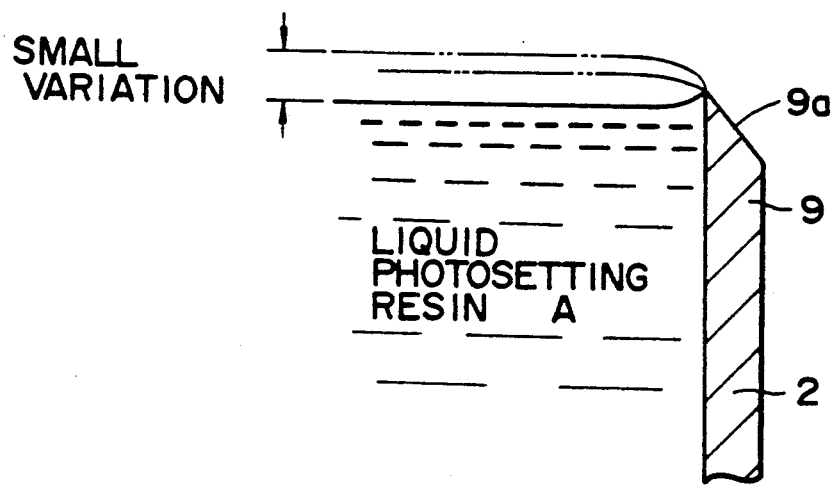
FIG. 2A is an enlarged fragmentary sectional view of the edge portion of an overflow weir.

FIG. 1 shows a main resin tank 2 and associated equipment included in a three-dimensional structure forming apparatus 1 in a first embodiment according to the present invention. The main resin tank 2 containing a liquid photosetting resin A which sets when exposed to ultraviolet rays is mounted on a base 3 provided with a leveling mechanism 3a. A heater 4 is wound around the main resin tank 2 to heat the liquid photosetting resin contained in the main resin tank 2 at a predetermined temperature. The heater 4 is controlled by a temperature controller 6 on the basis of the temperature of the liquid photosetting resin A detected by a temperature detector 5 so as to maintain the temperature of the liquid photosetting resin A contained in the main resin tank 2 at the predetermined temperature.

A stage, not shown, is placed in a horizontal position in the main resin tank 2 and is moved vertically by an elevating mechanism, not shown. A scanning unit, not shown, is disposed above the main resin tank 2 to irradiate the surface of the liquid photosetting resin A for scanning with a light beam. A molding controller, not shown, controls the scanning unit for exposure and scanning operation and controls the elevating mechanism for vertically moving the stage. The liquid photosetting resin A is irradiated with a light beam to form a hard resin layer of a shape corresponding to the pattern of a decomposed plate.

The main resin tank 2 is provided with at least one overflow weir 7 in one side wall thereof. The surplus liquid photosetting resin A overflows the overflow weir 7 and is returned to a replenishing tank 8, so that the liquid level of the liquid photosetting resin A is maintained constant. The overflow weir 7 consists of an edge member 9 having a sharp edge 9a and disposed slightly below the upper end 2a of the main resin tank 2, and a resin receiver 10 provided on the outer surface of the side wall of the main resin tank 2 to receive the liquid photosetting resin overflown the overflow weir 7. The position of the sharp edge 9a of the edge member 9 corresponds to a predetermined liquid level of the liquid photosetting resin A in the main resin tank 2.

Figure 2B:
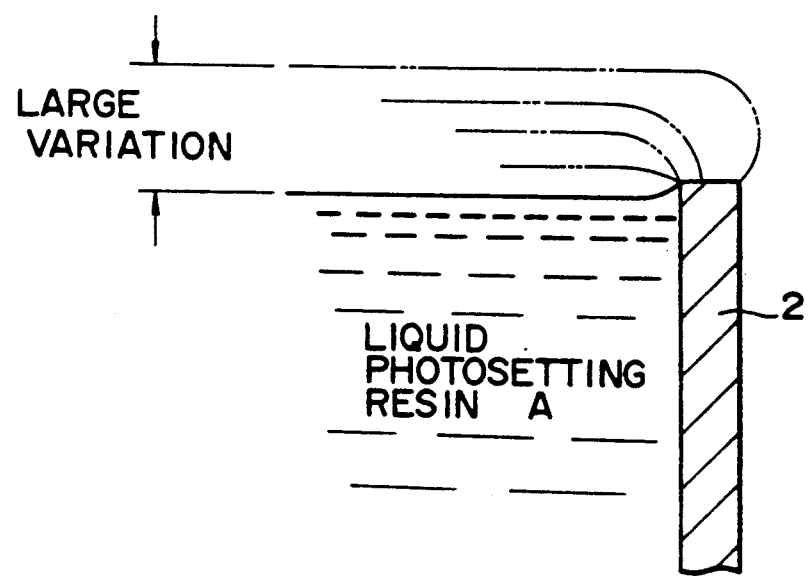
FIG. 2B is an enlarged fragmentary sectional view of the edge portion of an overflow weir for comparison with the edge portion shown in FIG. 2A.

Although the liquid photosetting resin A is heated by the heater 4 to reduce its viscosity, the liquid photosetting resin A has a very high viscosity and a high surface tension. Accordingly, the liquid photosetting resin A forms a meniscus and the liquid level of the liquid photosetting resin A varies as shown in FIG. 2B before the liquid photosetting resin A overflows the main resin tank 2. This variation of the liquid level of the liquid photosetting resin A is a significant problem in precisely controlling the liquid level of the liquid photosetting resin A.

To solve such a problem, the edge member 9 is used to make the liquid photosetting resin A overflow the sharp edge 9a of the edge member 9 continuously so that the liquid level of the liquid photosetting resin A is constant.

The liquid photosetting resin A which overflows the overflow weir 7 into the resin receiver 10 is returned through a return pipe 17 to the replenishing tank 8 where the surplus liquid photosetting resin A is stored.

The liquid photosetting resin A is supplied continuously at a predetermined rate through a supply pipe 13 to the main resin tank 2 by a supply pump 12 to replenish the main resin tank 2 with the liquid photosetting resin A so that the surplus liquid photosetting resin A overflows the overflow weir 7 continuously and the liquid level of the liquid photosetting resin A in the main resin tank 2 remains constant.

Figure 3:
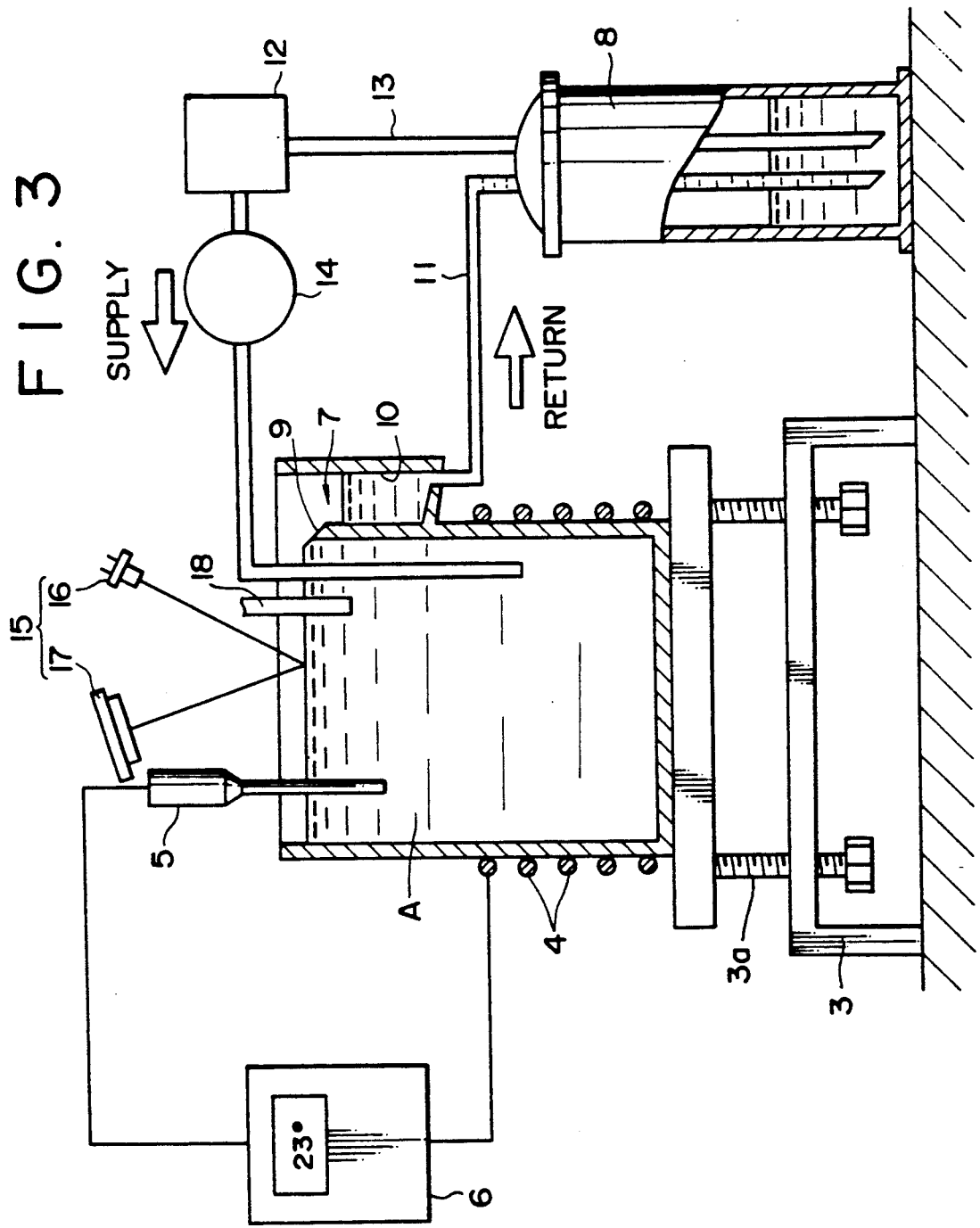
FIG. 3 is a schematic sectional view of a modification of the three-dimensional structure forming apparatus, additionally provided with a filter mechanism and a laser liquid level detector.

As shown in FIG. 3, a filter 14 may be inserted in the supply pipe 13 to remove set photosetting resin particles, dust and impurities from the liquid photosetting resin A before supplying the same to the main resin tank 2.

The main resin tank 2 may be provided with a laser liquid level detector 15 to detect the liquid level of the liquid photosetting resin A in the main resin tank 2 for monitoring and controlling the liquid level. The laser liquid level detector 15 comprises a laser 16 and a line sensor 17. The liquid level of the liquid photosetting resin A is detected from the position of incidence on the line sensor 17 of a laser beam projected by the laser 16 and reflected by the surface of the liquid photosetting resin A. A liquid level control bar 18 partly immersed in the liquid photosetting resin A is raised or lowered according to a liquid level detection signal provided by the laser liquid level detector 15 to regulate the liquid level of the liquid photosetting resin A precisely by varying the volume of the immersed portion of the liquid level control bar 18.

Figure 4:
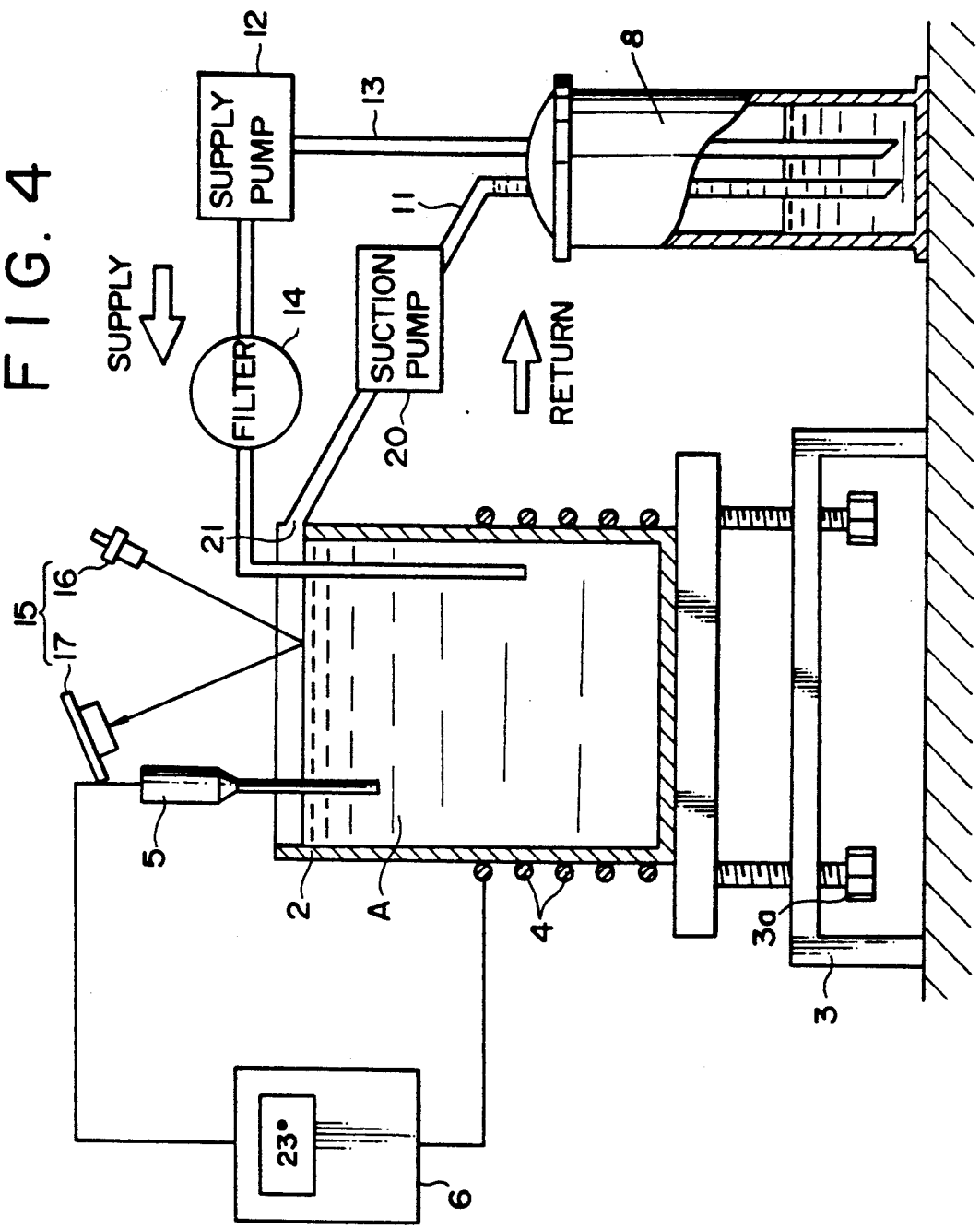
FIG. 4 is a schematic sectional view of a three-dimensional structure forming apparatus in a second embodiment according to the present invention.
Figure 5:
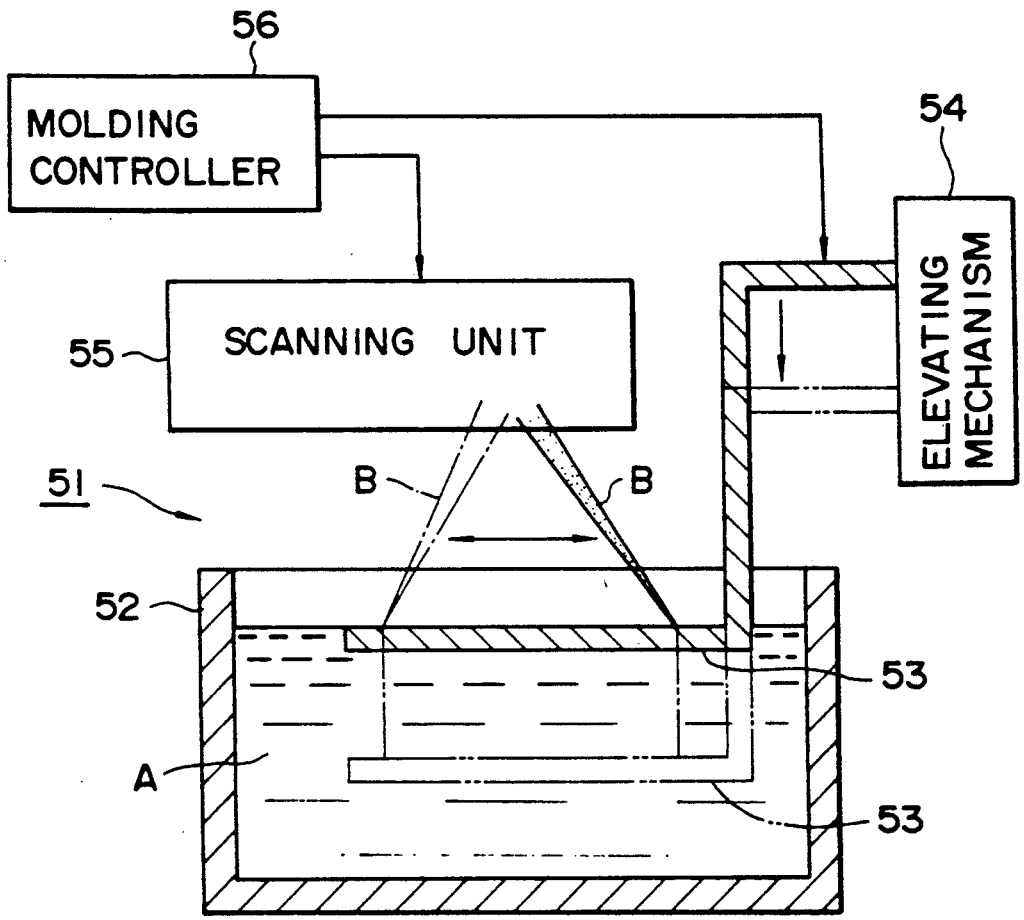
FIG. 5 is a schematic sectional view of a conventional three-dimensional structure forming apparatus.

Referring to FIG. 4, a three-dimensional structure forming apparatus in a second embodiment according to the present invention employs a main resin tank 2 provided with one or a plurality of suction openings 21 instead of the overflow weir 7. The suction opening 21 is formed in the side wall of the main resin tank 2 at a position corresponding to a predetermined liquid level, and a return pipe 11 is connected to the suction opening 21. The surplus liquid photosetting resin A overflowing the suction opening or suction openings 21 is sucked directly by a suction pump 20. The liquid photosetting resin A sucked through the suction opening or suction openings 21 is returned to a replenishing tank 8.

The main resin tank 2 may be provided with a laser liquid level detector 15, and the liquid level may be controlled positively by controlling the suction pump 20 and a supply pump 12 according to a liquid level detection signal provided by the laser liquid level detector 15 so that the liquid level of the liquid photosetting resin A is maintained constant.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A three-dimensional structure forming apparatus, which forms an optical three-dimensional structure by sequentially laminating hard resin layers, said three-dimensional structure forming apparatus comprising, a main tank which contains liquid photosetting resin; a replenishing tank; resin supply means continuously supplying the liquid photosetting resin from the replenishing tank to the main resin tank at a predetermined rate so that the liquid photosetting resin continuously overflows the main resin tank; and liquid photosetting resin return means which receives the liquid photosetting resin that overflows the main resin tank and supplies it to said replenishing tank, and wherein said liquid photosetting resin returning means comprises an overflow weir formed in one side wall of the main resin tank and provided with an edge member with a sharp edge and disposed so that the sharp edge is located at a position on the side wall corresponding to a desired liquid level for the liquid photosetting resin contained in the main resin tank, and an overflow tank attached to the main resin tank adjacent to the overflow weir so as to receive resin therefrom such that the structure maintains a constant distance between an optical device mounted above the main tank and the resin level in the main tank.

2. A three-dimensional structure forming apparatus, which forms an optical three-dimensional structure by sequentially laminating hard resin layers, said three-dimensional structure forming apparatus comprising, a main tank which contains liquid photosetting resin; a replenishing tank; resin supply means continuously supplying the liquid photosetting resin from the replenishing tank to the main tank at a predetermined rate so that the liquid photosetting resin continuously overflows the main resin tank; and liquid photosetting resin return means which receives the liquid photosetting resin that overflows the main resin tank and supplies it to said replenishing tank, and wherein said liquid photosetting resin return means comprises, a suction source conduit attached to one side wall of the main resin tank and with an opening located at a position on the side wall so as to maintain a desired liquid level of the liquid photosetting resin contained in the main resin tank, and a suction pump connected to the suction conduit so as to suck the liquid photosetting resin which overflows from the main resin tank through the suction conduit, such that the structure maintains a constant distance between an optical device mounted above the main tank and the resin level in the main tank.

3. A three-dimensional structure forming apparatus according to any one of claims 1 or 2, wherein a filter means is inserted in a resin supply line interconnecting the main resin tank and the replenishing tank.

* * * * *